(12) United States Patent
Lee et al.

(10) Patent No.: US 7,505,227 B2
(45) Date of Patent: Mar. 17, 2009

(54) APPARATUS AND METHOD FOR PREVENTING EXCESSIVE THERMAL POLE TIP PROTRUSION IN SLIDER OF A HARD DISK DRIVE

(75) Inventors: SungChang Lee, San Jose, CA (US); Sooyoul Hong, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 533 days.

(21) Appl. No.: 11/417,758

(22) Filed: May 3, 2006

(65) Prior Publication Data

US 2007/0258168 A1 Nov. 8, 2007

(51) Int. Cl.
    *G11B 21/21* (2006.01)
(52) U.S. Cl. .................................. 360/234.4
(58) Field of Classification Search ............. 360/234.4, 360/126, 128, 147, 236.5, 323
    See application file for complete search history.

(56) References Cited

U.S. PATENT DOCUMENTS

| 2005/0190496 A1* | 9/2005 | Hamann et al. ............ 360/128 |
| 2005/0254171 A1* | 11/2005 | Ota et al. .................. 360/128 |
| 2006/0007594 A1* | 1/2006 | Umehara et al. ........... 360/126 |
| 2006/0023367 A1* | 2/2006 | Suk ........................... 360/323 |
| 2006/0034013 A1* | 2/2006 | Kato et al. ................. 360/128 |
| 2008/0013912 A1* | 1/2008 | Shukh et al. ............... 385/147 |
| 2008/0266716 A1* | 10/2008 | Kato ....................... 360/236.5 |

FOREIGN PATENT DOCUMENTS

JP        2003141704 A       5/2003

OTHER PUBLICATIONS

Pust., L., Thermomechanical Head Performance, IEEE Trans. Magn., vol. 38, No. 1, Jan. 2002.

* cited by examiner

*Primary Examiner*—Tianjie Chen
(74) *Attorney, Agent, or Firm*—Earle Jennings; GSS Law Group (57) ABSTRACT

Slider used to access data on rotating disk in hard disk drive, including heating element as vertical micro-actuator coupled to deformation region including read-write head and to expansion chamber, plate thermally coupled to heat sink. Slider further includes vertical control signal stimulating heating element coupled to film to alter vertical position, and expansion chamber, plate, and heat sink minimizing thermal pole tip protrusion. Flexure finger including micro-actuator assembly for coupling to slider, and possibly providing vertical control signal to heating element. Head gimbal assembly including flexure finger coupled to the slider. A head stack assembly including at least one of the head gimbal assemblies coupled to a head stack. Hard disk drive including head stack assembly. The invention includes manufacturing the slider, the head gimbal assembly, the head stack assembly, and the hard disk drive, as well as these items as products of the invention's manufacturing processes.

26 Claims, 11 Drawing Sheets

APPARATUS AND METHOD FOR PREVENTING EXCESSIVE THERMAL POLE TIP PROTRUSION IN SLIDER OF A HARD DISK DRIVE

TECHNICAL FIELD

This invention relates to hard disk drives, in particular, to apparatus and methods for controlling excessive thermal pole tip protrusion in a slider above a rotating disk surface in a hard disk drive.

BACKGROUND OF THE INVENTION

Contemporary hard disk drives include an actuator assembly pivoting through an actuator pivot to position one or more read-write heads, embedded in sliders, each over a rotating disk surface. The data stored on the rotating disk surface is typically arranged in concentric tracks. To access the data of a track, a servo controller first positions the read-write head by electrically stimulating the voice coil motor, which couples through the voice coil and an actuator arm to move a head gimbal assembly in lateral positioning the slider close to the track. Once the read-write head is close to the track, the servo controller typically enters an operational mode known herein as track following. It is during track following mode that the read-write head is used to access the data stored in the track.

Micro-actuators provide a second actuation stage for lateral positioning the read-write head during track following mode. They often use an electrostatic effect and/or a piezoelectric effect to rapidly make fine position changes. They have doubled the bandwidth of servo controllers and are believed essential for high capacity hard disk drives from hereon.

A central feature of the hard disk drive industry is its quest for greater data storage density, leading to continued reduction in track width, the flying height or vertical positioning of the read-write head off the rotating disk surface, and the size of the read head within the read-write head. As these factor shrink, the possibility of the read-write head contacting the rotating disk surface increases and the potential for damage to the disk surface and the read-write head grows. Thermal tip pole protrusion is a situation that can lead the read-write head into contact with the data of the rotating disk surface, particularly when in track following mode. This situation is usually caused by an excessive temperature near the read-write head of the slider.

Figure 1A:
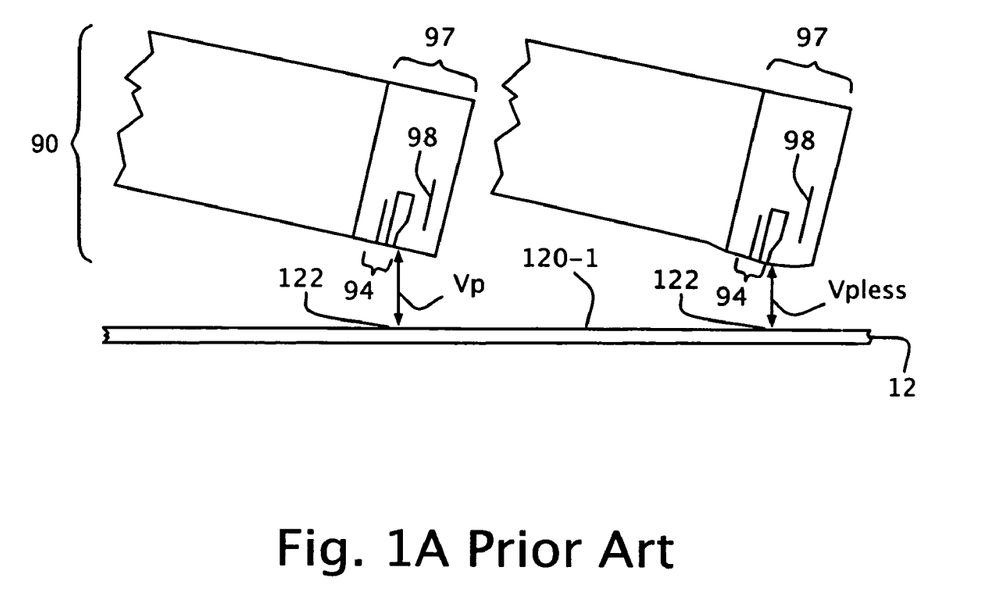
FIGS. 1A and 1B show an example prior art slider including a vertical micro-actuator employing a heater and experiencing thermal pole tip protrusion.
Figure 1B:
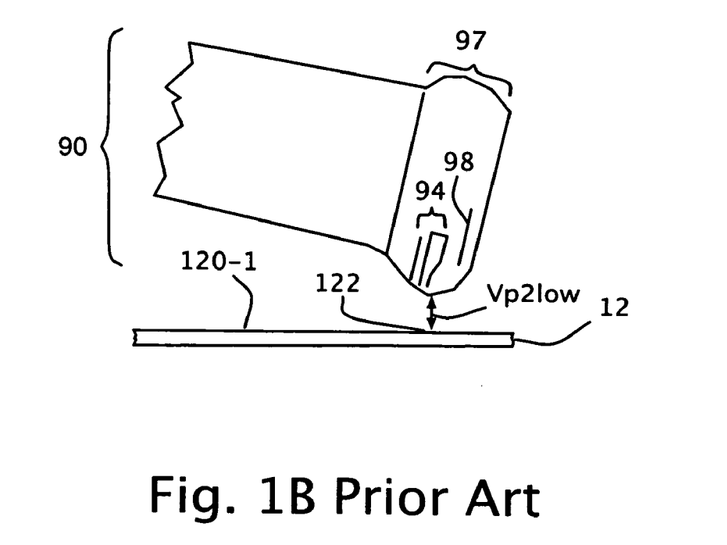

Consider a heating element used as a vertical micro-actuator 98 embedded in a slider 90 to expand a deformation region 97 and reduce the vertical distance Vp between the slider and a rotating disk surface from an initial vertical distance to a reduced vertical distance as shown in FIG. 1A. Since when power is applied to the vertical micro-actuator, actuation of a deformation is always in the direction of decreased vertical distance. Though this approach is gaining favor at this time, typically complicated schemes should be incorporated eclectically with this device in order to avoid undesirable head to disk surface contacts due to excessive pole tip protrusion. Excessive overheating can happen due to either malfunction of electrical control or sudden change of environmental conditions, especially high temperature and altitude. What is needed is a mechanism and method keeping the deformation region from overheating, and at the same time minimizing the chances of undesirable head to disk surface contacts.

SUMMARY OF THE INVENTION

Figure 1C:
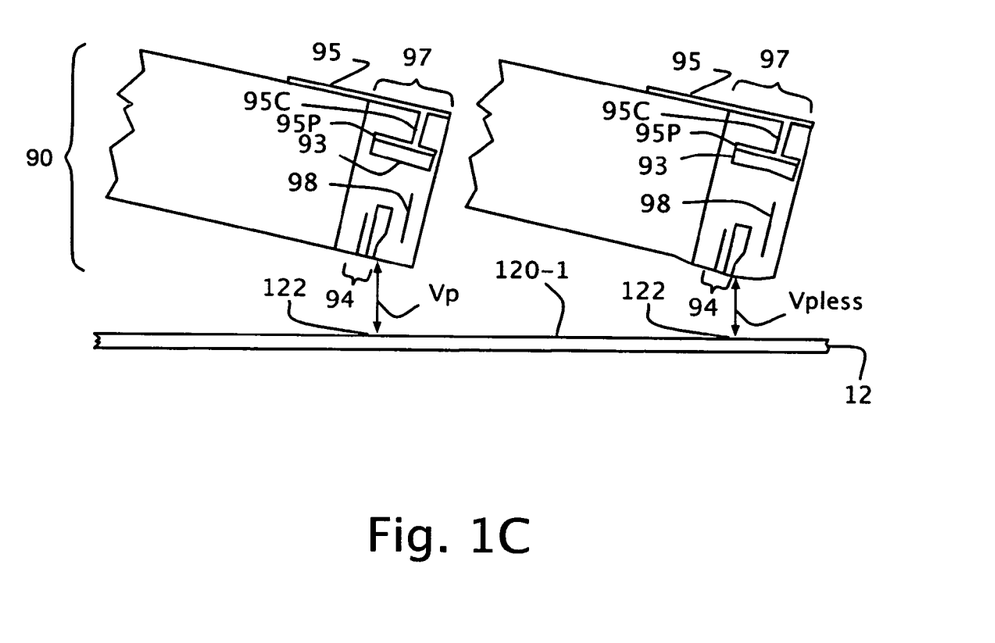
FIGS. 1C to 1E show an example of the invention's slider.
Figure 1D:
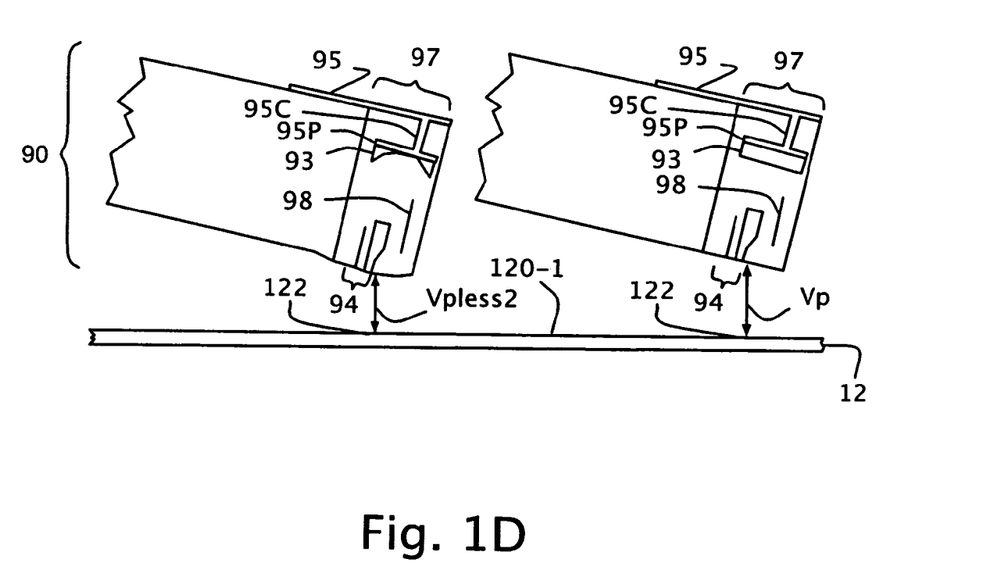

The invention's slider, used to access data on a rotating disk in a hard disk drive, includes a heating element forming a vertical micro-actuator, coupled to a deformation region including a read-write head and stimulated by a vertical control signal providing a potential difference with a first slider power terminal, and heating the deformation region to alter the vertical position of the read-write head over the rotating disk surface in a hard disk drive as shown in FIG. 1C. The slider further includes an expansion chamber coupling to the deformation region and a heat sink plate thermally coupling to a heat sink. Whenever the deformation region expands into the expansion chamber and contacts the heat sink plate, heat from the deformation region is thermally transferred out of the deformation region to the heat sink thermally coupled to the heat sink plate, lowering the temperature of the deformation region and limiting thermal pole tip protrusion of the slider, as shown in FIG. 1D.

The slider, and its read-write head may further include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the vertical micro-actuator.

The flexure finger may include a micro-actuator assembly for mechanically coupling to an embodiment of the slider. The flexure finger may include a vertical control signal path providing the vertical control signal to the slider and the heating element. The micro-actuator assembly may aid in lateral positioning, and may further aid in vertical positioning of the read-write head over the data of the rotating disk surface. The micro-actuator assembly may employ a piezoelectric effect and/or an electrostatic effect to aid in positioning the read-write head.

The invention also includes a head gimbal assembly including the invention's flexure finger coupled to the slider, which further includes the micro-actuator assembly mechanically coupled to the slider and the vertical control signal path electrically coupled to the vertical control signal of the slider. The invention includes a head stack assembly including at least one of the head gimbal assemblies coupled to a head stack. The invention includes a hard disk drive including a head stack assembly, which includes at least one of the head gimbal assemblies.

The invention includes manufacturing the slider, the flexure finger, the head gimbal assembly, the head stack assembly, and the hard disk drive, as well as these items as products of the invention's manufacturing processes.

DETAILED DESCRIPTION

This invention relates to hard disk drives, in particular, to apparatus and methods for controlling excessive thermal pole tip protrusion in a slider used to access data on a rotating disk surface in a hard disk drive.

Figure 2A:
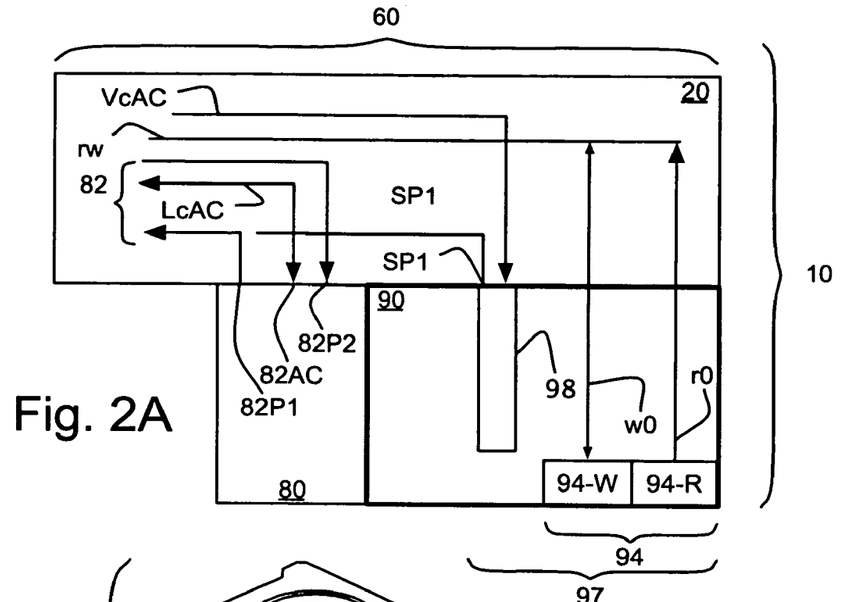
FIGS. 2A and 2B show some aspects of the invention's flexure finger and head gimbal assembly and their relationship with the invention's slider.

The invention's slider 90 includes a heating element 98 forming a vertical micro-actuator, coupled to a deformation region 97 including a read-write head 94 and stimulated by a vertical control signal VcAC providing a potential difference with a first slider power terminal SP1, and heating the deformation region to alter the vertical position Vp of the read-write head over the rotating disk surface 120-1 in a hard disk drive 10 as shown in FIGS. 1C and 2A. The slider further includes an expansion chamber 93 coupling to the deformation region and a heat sink plate 95P thermally coupling 95C to a heat sink 95. Whenever the deformation region expands into the expansion chamber and contacts the heat sink plate, heat from the deformation region is thermally transferred out of the deformation region to the heat sink thermally coupled to the heat sink plate, lowering the temperature of the deformation region and limiting thermal pole tip protrusion of the slider, as shown in FIG. 1D.

Figure 1E:
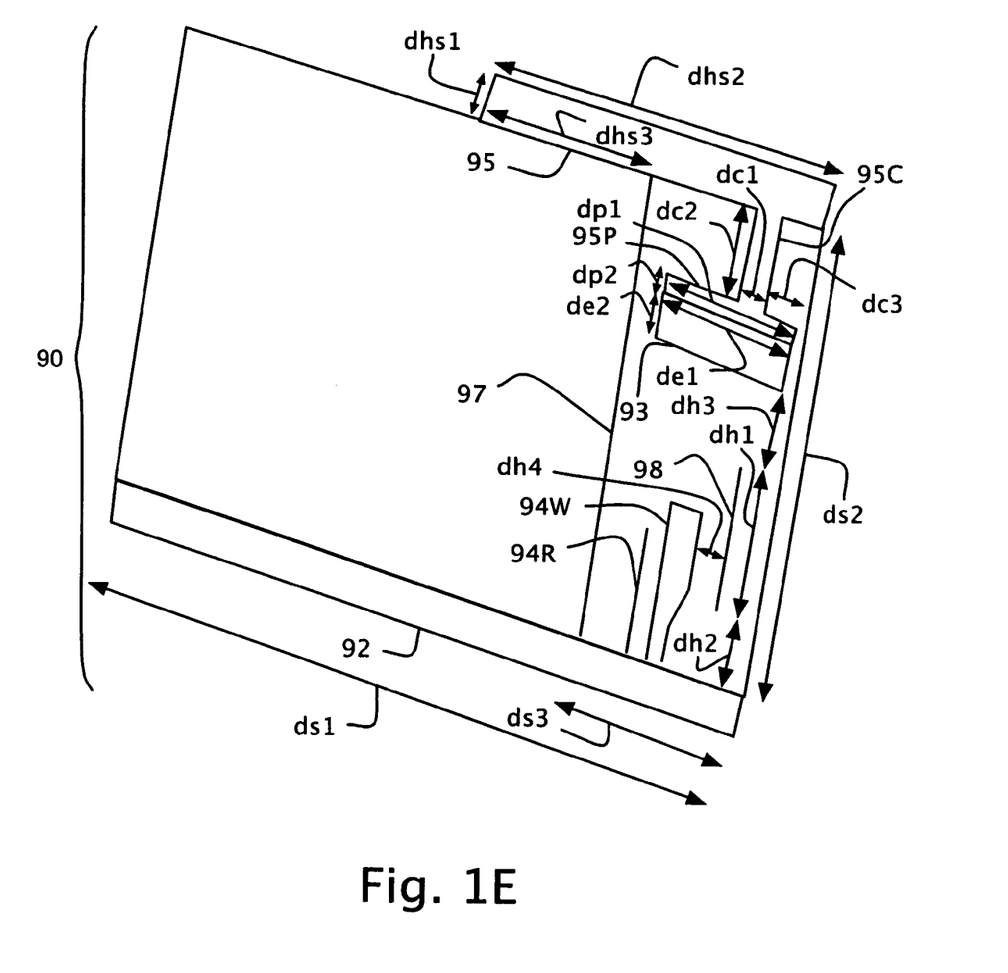

The slider 90 further includes an air bearing surface 92 as shown in FIG. 1E, and possesses a slider length ds1 and a slider height ds2. The deformation region 97 has a deformation region length ds3. The heating element 98 has a heater height dh1 and is situated a heater offset from air bearing surface dh2, a heater offset from expansion chamber dh3, and a heat distance from the write head dh4, where the write head is designated 94W and the read head 94R. The expansion chamber 93 possesses an expansion chamber width de1 and an expansion chamber height de2. The heat sink plate 95P has a plate width dp1 and a plate height dp2. The heat sink coupling 95C possesses a heat coupling width dc1, a heat coupling depth dc2 and a coupling offset from plate edge dc3. The heat sink 95 possesses a heat sink depth dhs1, a heat sink length dhs2, a heat sink extension outside deformation region dhs3.

In certain embodiments, the coupling offset from plate edge dc3 may be essentially zero micrometers (μm), alternatively it may be greater than zero μm as shown. The heat coupling depth dc2 may be essentially zero μm, alternatively, it may be greater than zero μm, as shown. The heat coupling width dc1 may be essentially the plate width dp1, alternatively, it may be less than the plate width as shown. The heat sink extension outside deformation region dhs3 may be zero μm, or alternatively greater than zero μm, as shown. All of the parameters of FIG. 1E are preferably greater than zero μm, unless otherwise mentioned.

The slider, and its read-write head may further include a read head using a spin valve to read the data on the rotating disk surface, or use a tunneling valve to read the data. The slider may further include the read head providing a read differential signal pair to an amplifier to generate an amplified read signal reported by the slider as a result of the read access of the data on the rotating disk surface. The amplifier may be opposite the air bearing surface, and may be separate from the deformation region, and may further be separate from the heat sink plate 95P.

The slider 90 is used to access the data 122 on the rotating disk surface 120-1 in a hard disk drive 10. The data is typically organized in units known as a track 122, which are usually arranged in concentric circles on the rotating disk surface centered about a spindle shaft 40 and alternatively may be organized as joined spiral tracks. Operating the slider to read access the data on the rotating disk surface includes the read head 94-R driving the read differential signal pair r0 to read access the data on the rotating disk surface. The read-write head 94 is formed perpendicular to the air bearing surface 92 to the amplifier 96.

Figure 3A:
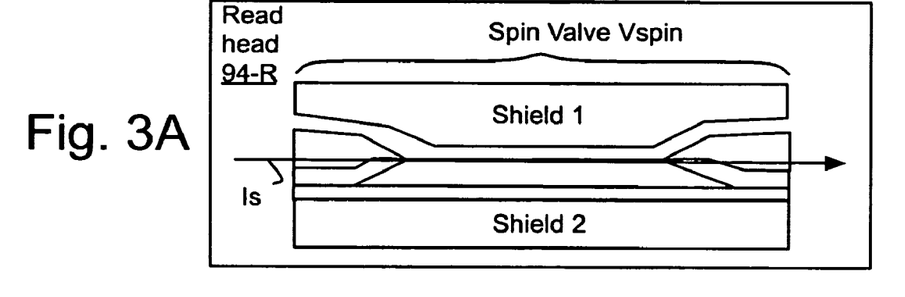
FIG. 3A shows an example of the read head of FIG. 2A employing a spin valve.

The read head 94-R may use a spin valve to drive the read differential signal pair as shown in FIG. 3A. As used herein, the spin valve employs a magneto-resistive effect to create an induced sensing current Is between the first shield Shield1 and the second shield Shield2. Spin valves have been in use the since the mid 1990's.

Figure 3B:
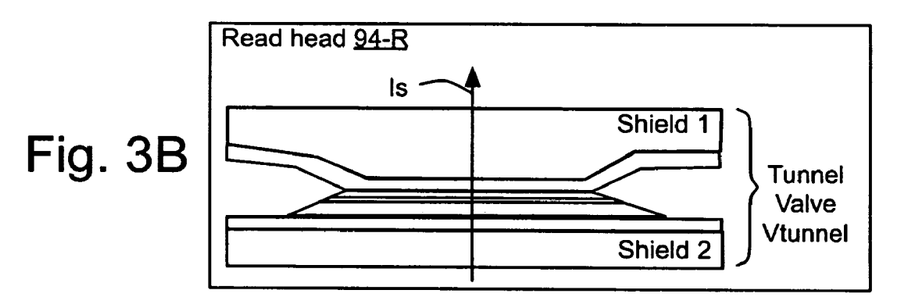
FIG. 3B shows an example of the read head of FIG. 2A employing a tunnel valve.
Figure 3C:
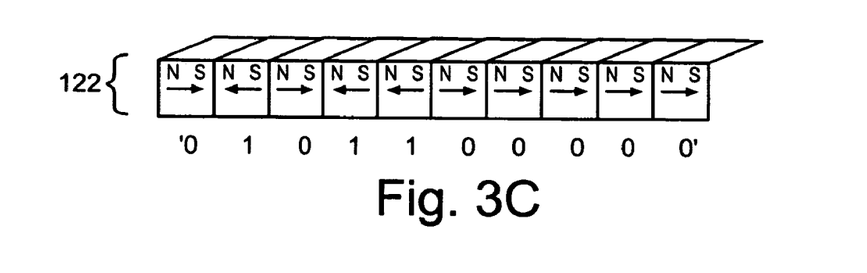
FIG. 3C shows a typical polarization of bits in the track on the rotating disk surface used with the spin valve of FIG. 3A, which is parallel the rotating disk surface.
Figure 3D:
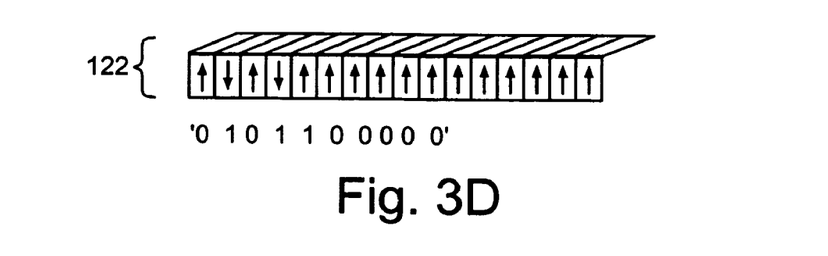
FIG. 3D shows a typical polarization of bits in the track on the rotating disk surface used with the tunneling valve of FIG. 3B, which is perpendicular to the rotating disk surface.

The read head 94-R may use a tunnel valve to drive the read differential signal pair as shown in FIG. 3B. As used herein, a tunnel valve uses a tunneling effect to modulate the sensing current Is perpendicular to the first shield Shield1 and the second shield Shield2. Both longitudinally recorded signals as shown in FIG. 3C and perpendicularly recorded signals shown in FIG. 3D can be read by either reader type. Perpendicular versus longitudinal recording relates to the technology of the writer/media pair, not just the reader. This difference in bit polarization lead to the announcement of a large increase in data density, a jump of almost two hundred percent in the spring of 2005.

The tunnel valve is used as follows. A pinned magnetic layer is separated from a free ferromagnetic layer by an insulator, and is coupled to a pinning antiferromagnetic layer. The magneto-resistance of the tunnel valve is caused by a change in the tunneling probability, which depends upon the relative magnetic orientation of the two ferromagnetic layers. The sensing current Is, is the result of this tunneling probability. The response of the free ferromagnetic layer to the magnetic field of the bit of the track 122 of the rotating disk surface 120-1, results in a change of electrical resistance through the tunnel valve.

Figure 4A:
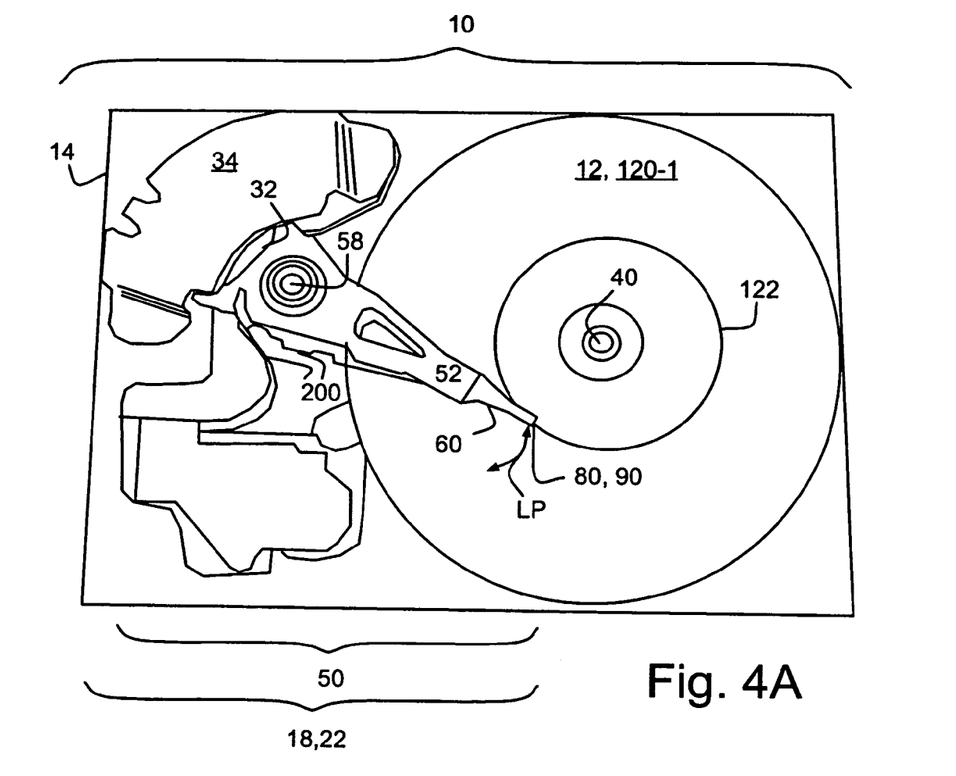
FIG. 4A shows a partially assembled hard disk drive of FIG. 2A.
Figure 4B:
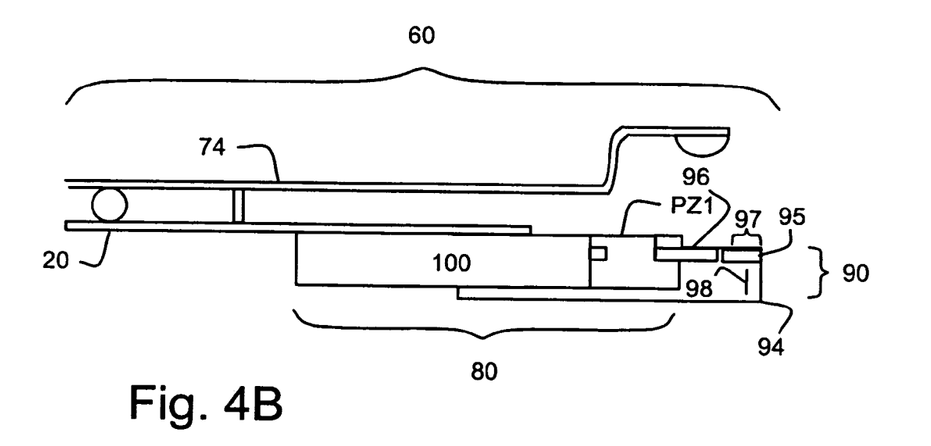
FIG. 4B shows the head gimbal assembly of FIGS. 2A and 2B including the slider of coupled with a micro-actuator assembly using the piezoelectric effect.
Figure 8A:
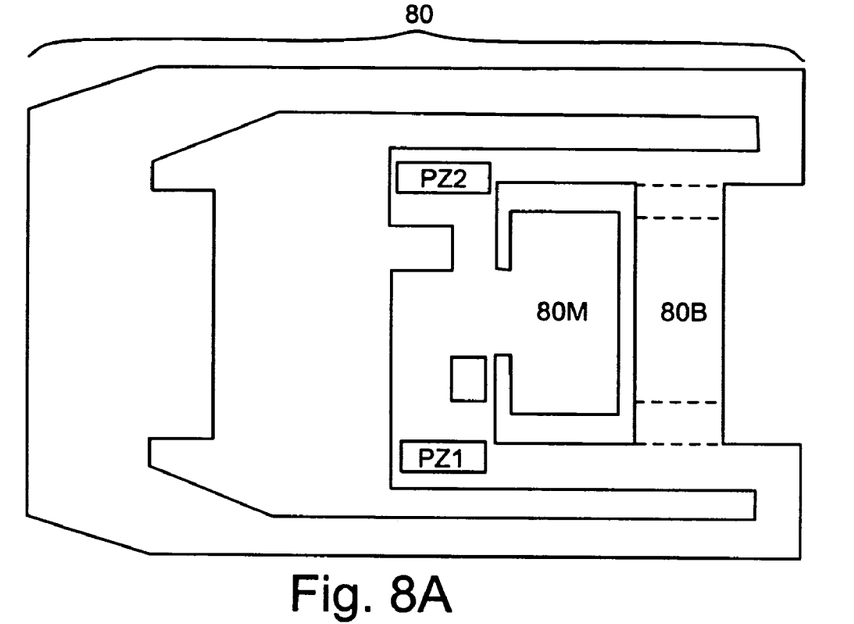
FIG. 8A shows an example of the use of the piezoelectric effect in the micro-actuator assembly of FIG. 4B.
Figure 8B:
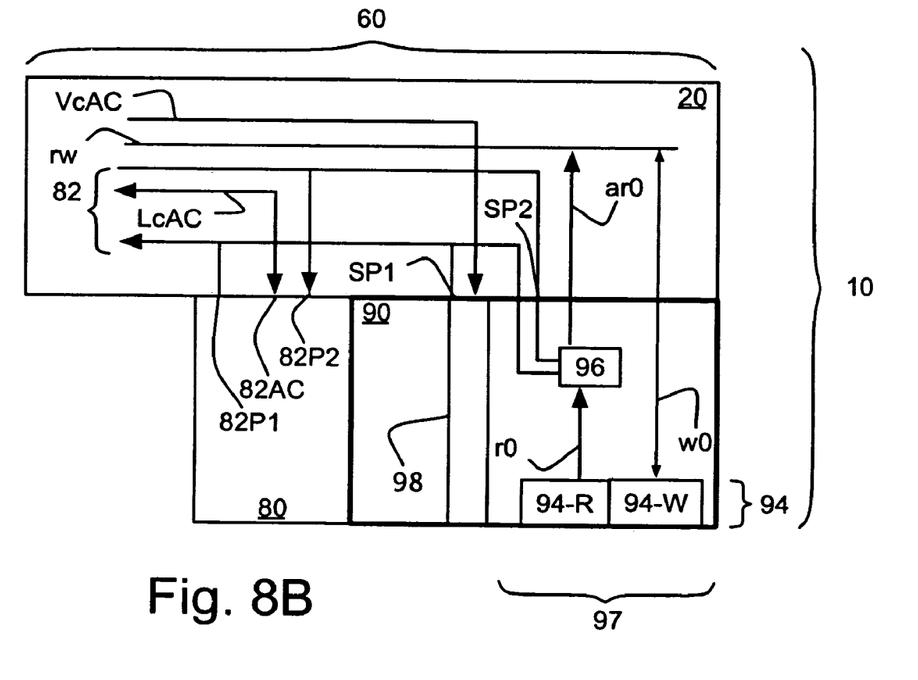
FIG. 8B shows a refinement of the head gimbal assembly, the flexure finger, and the slider of FIG. 2A.
Figure 9A:
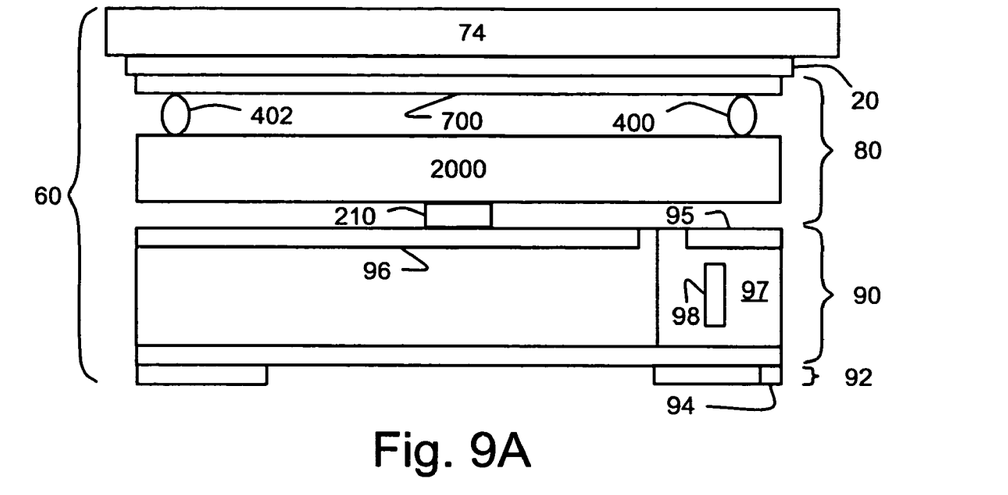
FIGS. 9A and 9B show an example of the use of the electrostatic effect in a micro-actuator assembly for the head gimbal assembly of FIG. 2A.

The invention's slider 90 may further include the read-write head 94 providing the read-differential signal pair r0 to the amplifier 96 to generate the amplified read signal ar0, as shown in FIG. 8B. The read-write head preferably includes a read head 94-R driving the read differential signal pair r0 and a write head 94-W receiving a write differential signal pair w0. The slider reports the amplified read signal as a result of read access of the data on the rotating disk surface. In most but not necessarily all of the embodiments of the invention's slider, the amplifier is preferably opposite the air bearing surface 92. The amplified read signal ar0 may be implemented as an amplified read signal pair ar0+− or as a single ended read signal. The vertical micro-actuator 98 included in the slider operates by inducing a strain on the deformation region 97 as well as any other materials directly coupled to it, making it preferable for the amplifier to be separated from the vertical micro-actuator and the deformation region, as shown in FIGS. 4B, 8B, and 9A. These embodiments of the invention's slider preferably include a first slider power terminal SP1 and a second slider power terminal SP2 collectively used to power the amplifier in generating the amplified read signal ar0.

Manufacturing the invention's slider 90 may include the following and/or similar steps: Forming the heating element 98 coupling to the deformation region 97, including the read head 94R and the write head 94W. The forming of the heating element may involve sputtering and/or electro-deposition onto the deformation region. Forming the air bearing surface 92 may include a photo-etching or other lithographic process.

Manufacturing the slider 90 may further include coupling the read-write head 94 to the amplifier 96, which further includes electrically coupling the read differential signal pair to the amplifier. The invention includes the manufacturing process of the slider and the slider as a product of that manufacturing process. The manufacturing further includes providing an air bearing surface 92 near the read head 94-R.

Coupling the read-write head 94 to the amplifier 96 may further include bonding the amplifier to the read head 94-R and/or building the amplifier to the read head. Bonding the amplifier may include gluing, and/or welding, and/or soldering the amplifier to the read head. Building the amplifier may include depositing an insulator to create a signal conditioning base, and/or using a slider substrate as a signal conditioning base, and/or depositing a first semiconductor layer on the signal conditioning base. The building may further include defining at least one pattern, at least one etch of the pattern to create at least one layer, for at least one semiconducting material and forming at least one layer of metal to form at least one transistor circuit embodying the amplifier. The transistors preferably in use at the time of the invention include, but are not limited to, bipolar transistors, Field Effect Transistors (FETs), and amorphous transistors.

The flexure finger may include a micro-actuator assembly for mechanically coupling to an embodiment of the slider. The flexure finger may include a vertical control signal path providing the vertical control signal to the slider and the heating element in its vertical micro-actuator. The micro-actuator assembly may aid in lateral positioning, and may further aid in vertical positioning of the read-write head over the data of the rotating disk surface. The micro-actuator assembly may employ a piezoelectric effect and/or an electrostatic effect to aid in positioning the read-write head.

Figure 5:
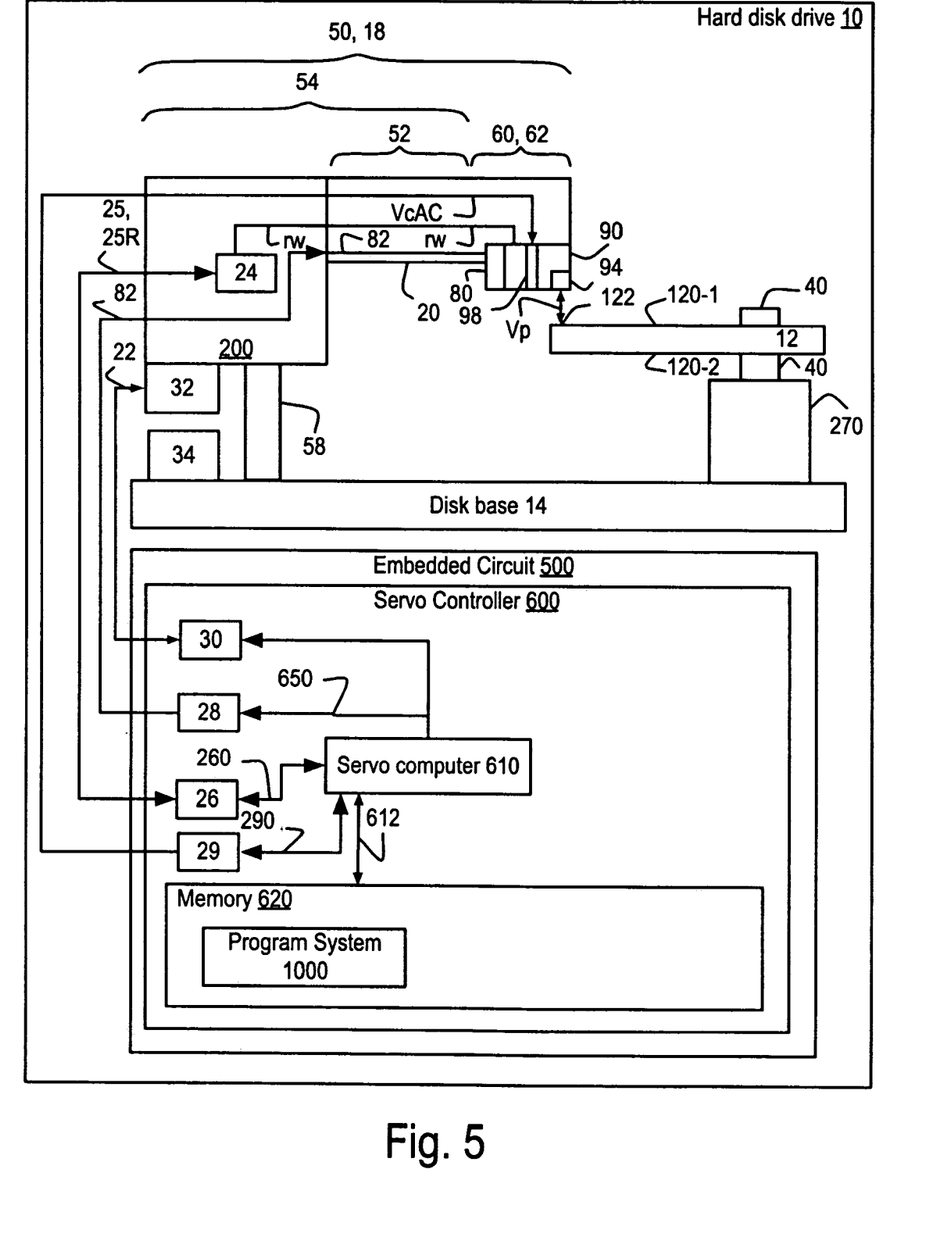
FIGS. 5 to 7 show some details of the hard disk drive of FIGS. 2A and 4A.

The flexure finger 20 for the slider 90 of FIGS. 2A, 5, 6, and 8B, which preferably contains a micro-actuator assembly 80 for mechanically coupling to the slider to aid in positioning the slider to access the data 122 on 120-1 rotating disk surface of the disk 12. The micro-actuator assembly may aid in laterally positioning LP the slider to the rotating disk surface as shown in FIG. 3A and/or aid in vertically positioning VP the slider as shown in FIGS. 1C, 1D, and 5. The flexure finger 20 may further provide the vertical control signal VcAC and preferably the first lateral control signal 82P1 as the first slider power terminal SP1 to the vertical micro-actuator.

The flexure finger 20 preferably includes the lateral control signal 82 and trace paths between the slider for the write differential signal pair w0. The lateral control signal preferably includes the first lateral control signal 82P1 and the second lateral control signal 82P2, as well as the AC lateral control signal 82AC. When the slider does not contain an amplifier 96, as shown in FIGS. 1C, 1D, 2A, 5 and 6, the flexure finger further preferably provides trace paths for the read differential signal pair r0.

The micro-actuator assembly 80 may employ a piezoelectric effect and/or an electrostatic effect to aid in positioning the slider 90. First, examples of micro-actuator assemblies employing the piezoelectric effect will be discussed followed by electrostatic effect examples. In several embodiments of the invention the micro-actuator assembly may preferably couple with the head gimbal assembly 60 through the flexure finger 20, as shown in FIGS. 2A, 2B, 5 and 8B. The micro-actuator assembly may further couple through the flexure finger to a load beam 74 to the head gimbal assembly and consequently to the head stack assembly 50.

Examples of micro-actuator assemblies employing the piezoelectric effect are shown in FIGS. 4B and 8A. FIG. 4B shows a side view of a head gimbal assembly with a micro-actuator assembly 80 including at least one piezoelectric element PZ1 for aiding in laterally positioning LP of the slider 90. In certain embodiments, the micro-actuator assembly may consist of one piezoelectric element. The micro-actuator assembly may include the first piezoelectric element and a second piezoelectric element PZ2, both of which may preferably aid in laterally positioning the slider. In certain embodiments, the micro-actuator assembly may be coupled with the slider with a third piezoelectric element PZ3 to aid in the vertically positioning the slider above the rotating disk surface 120-1.

Figure 9B:
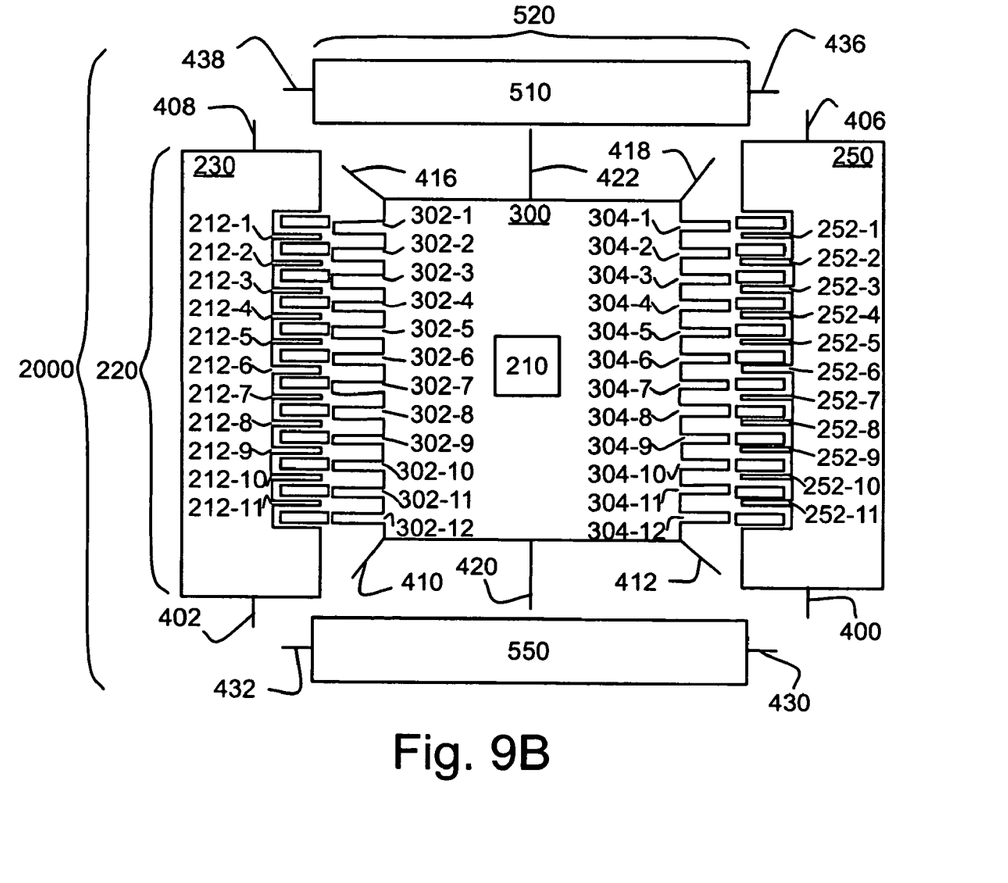

Examples of the invention using micro-actuator assemblies employing the electrostatic effect are shown in FIGS. 9A and 9B derived from the Figures of U.S. patent application Ser. No. 10/986,345, which is incorporated herein by reference. FIG. 9A shows a schematic side view of the micro-actuator assembly 80 coupling to the flexure finger 20 via a micro-actuator mounting plate 700. FIG. 9B shows the micro-actuator assembly using an electrostatic micro-actuator assembly 2000 including a first electrostatic micro-actuator 220 to aid the laterally positioning LP of the slider 90. The electrostatic micro-actuator assembly may further include a second electrostatic micro-actuator 520 to aid in the vertically positioning VP of the slider.

The first micro-actuator 220 includes the following. A first pivot spring pair 402 and 408 coupling to a first stator 230. A second pivot spring pair 400 and 406 coupling to a second stator 250. A first flexure spring pair 410 and 416, and a second flexure spring pair 412 and 418, coupling to a central movable section 300. A pitch spring pair 420-422 coupling to the central movable section 300. The central movable section 300 includes signal pair paths coupling to the write differential signal pair W0 and either the read differential signal pair r0 or the amplified read signal ar0 of the read-write head 94 of the slider 90.

The bonding block 210 may electrically couple the read-write head 90 to the amplified read signal ar0 and write differential signal pair W0, and mechanically couples the central movable section 300 to the slider 90 with read-write head 94 embedded on or near the air bearing surface 92 included in the slider.

The first micro-actuator 220 aids in laterally positioning LP the slider 90, which can be finely controlled to position the read-write head 94 over a small number of tracks 122 on the rotating disk surface 120-1. This lateral motion is a first mechanical degree of freedom, which results from the first stator 230 and the second stator 250 electrostatically interacting with the central movable section 300. The first microactuator 220 may act as a lateral comb drive or a transverse comb drive, as is discussed in detail in the incorporated United States Patent Application.

The electrostatic micro-actuator assembly 2000 may further include a second micro-actuator 520 including a third stator 510 and a fourth stator 550. Both the third and the fourth stator electrostatically interact with the central movable section 300. These interactions urge the slider 90 to move in a second mechanical degree of freedom, aiding in the vertically positioning VP to provide flying height control. The second micro-actuator may act as a vertical comb drive or a torsional drive, as is discussed in detail in the incorporated United States Patent Application. The second micro-actuator may also provide motion sensing, which may indicate collision with the rotating disk surface 120-1 being accessed.

The central movable section 300 not only positions the read-write head 10, but may act as the conduit for the write differential signal pair w0 and in certain embodiments, the first slider power signal SP1 and the second slider power signal SP2, as well as the read differential signal pair r0 or the amplified read signal ar0. The electrical stimulus of the first micro-actuator 220 is provided through some of its springs.

The central movable section 300 may preferably to be at ground potential, and so does not need wires. The read differential signal pair r0, the amplified read signal ar0, the write differential signal pair w0 and/or the slider power signals SP1 and SP2 traces may preferably be routed with flexible traces all the way to the load beam 74 as shown in FIG. 9A.

The flexure finger 20 may further provide a read trace path rtp for the amplified read signal ar0, as shown in FIG. 8B. The slider 90 may further include a first slider power terminal SP1 and a second slider power terminal SP2, both electrically coupled to the amplifier 96 to collectively provide power to generate the amplified read signal ar0. The flexure finger may further include a first power path SP1P electrically coupled to the first slider power terminal SP1 and/or a second power path SP2P electrically coupled to the second slider power terminal SP2, which are collectively used to provide electrical power to generate the amplified read signal.

The invention's head gimbal assembly includes the invention's flexure finger coupled to the slider, which further includes the micro-actuator assembly mechanically coupled to the slider and may further include the vertical control signal path electrically coupled to the vertical control signal of the slider. The invention's head stack assembly includes at least one of the head gimbal assemblies coupled to a head stack. The invention's hard disk drive includes a head stack assembly, which includes at least one of the head gimbal assemblies.

The head gimbal assembly 60 includes the flexure finger 20 coupled with the slider 90 and a micro-actuator assembly 80 mechanically coupling to the slider to aid in positioning the slider to access the data 122 on the rotating disk surface 120-1. The micro-actuator assembly may further include a first micro-actuator power terminal 82P1 and a second micro-actuator power terminal 82P2. The head gimbal assembly may further include the first micro-actuator power terminal electrically coupled to the first power path SP1P and/or the second micro-actuator power terminal electrically coupled to the second power path SP2P. Operating the head gimbal assembly may further preferably include operating the micro-actuator assembly to aid in positioning the slider to read access the data on the rotating disk surface, which includes providing electrical power to the micro-actuator assembly.

The head gimbal assembly 60 may further provide the vertical control signal VcAC to the heating element of the vertical micro-actuator 98, as shown in FIGS. 5 and 8B. Operating the head gimbal assembly may further preferably include driving the vertical control signal. The first micro-actuator power terminal 82P1 may be tied to the first slider power terminal SP1, and both electrically coupled to the first power path SP1P.

The head gimbal assembly 60 may further include the amplifier 96 to generate the amplified read signal ar0 using the first slider power terminal SP1 and the second slider power terminal SP2. The flexure finger 20 may further contain a read trace path rtp electrically coupled to the amplified read signal ar0, as shown in FIG. 8B. The head gimbal assembly operates as follows when read accessing the data 122, preferably organized as the track 122, on the rotating disk surface 120-1. The slider 90 reports the amplified read signal ar0 as the result of the read access.

Figure 2B:
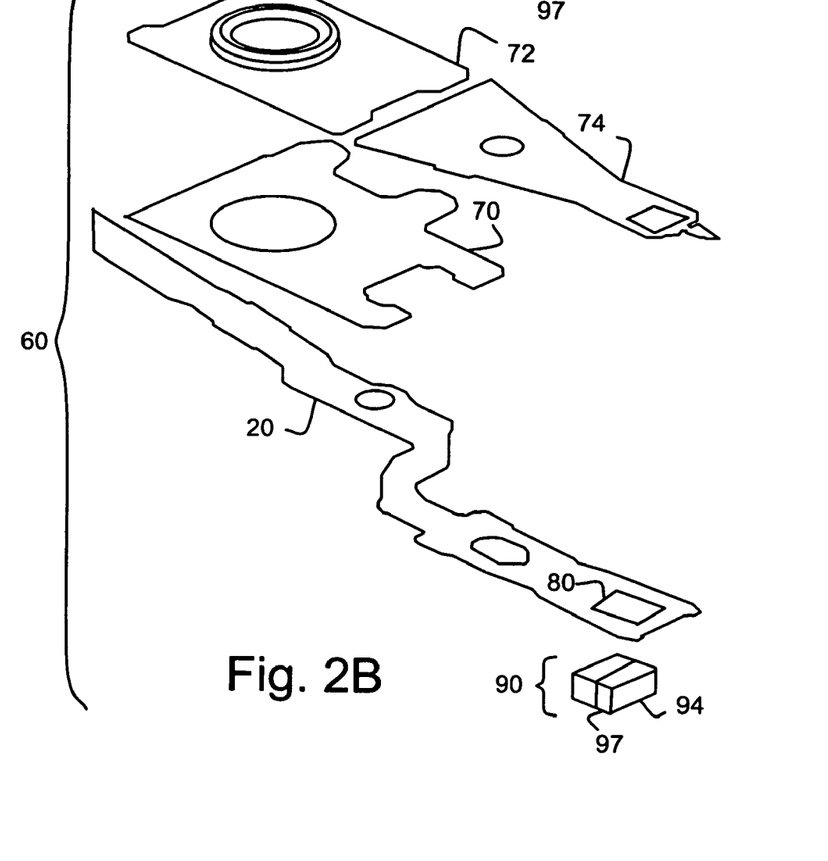

The flexure finger 20 may be coupled to the load beam 74 as shown in FIGS. 2B and 9A, which may further include the first power path SP1P electrically coupled to a metallic portion of the load beam. In certain embodiments, the metallic portion may be essentially all of the load beam.

In further detail, the head gimbal assembly 60 includes a base plate 72 coupled through a hinge 70 to a load beam 74. Often the flexure finger 20 is coupled to the load beam and the micro-actuator assembly 80 and slider 90 are coupled through the flexure finger to the head gimbal assembly. The load beam may preferably electrically couple to the slider to the first slider power terminal SP1, and may further preferably electrically couple to the micro-actuator assembly to form the first power path SP1P.

Manufacturing the invention's head gimbal assembly 60 includes coupling the flexure finger 20 to the invention's slider 90, which further includes mechanically coupling the micro-actuator assembly 80 to the slider. Coupling the flexure finger to the slider may further include electrically coupling the read trace path rtp with the amplified read signal ar0 as shown in FIG. 8B or alternatively, providing the read differential signal pair r0. Coupling the micro-actuator assembly to the slider may include electrically coupling the first micro-actuator power terminal 82P1 to the first slider power terminal SP1P and/or electrically coupling the second micro-actuator power terminal 82P2 to the second slider power terminal SP2P. The invention includes this manufacturing process and the head gimbal assembly as a product of the process. Manufacturing the invention's head gimbal assembly 60 may further include electrically coupling the flexure finger 20 to provide the vertical control signal VcAC to the slider 98.

Figure 6:
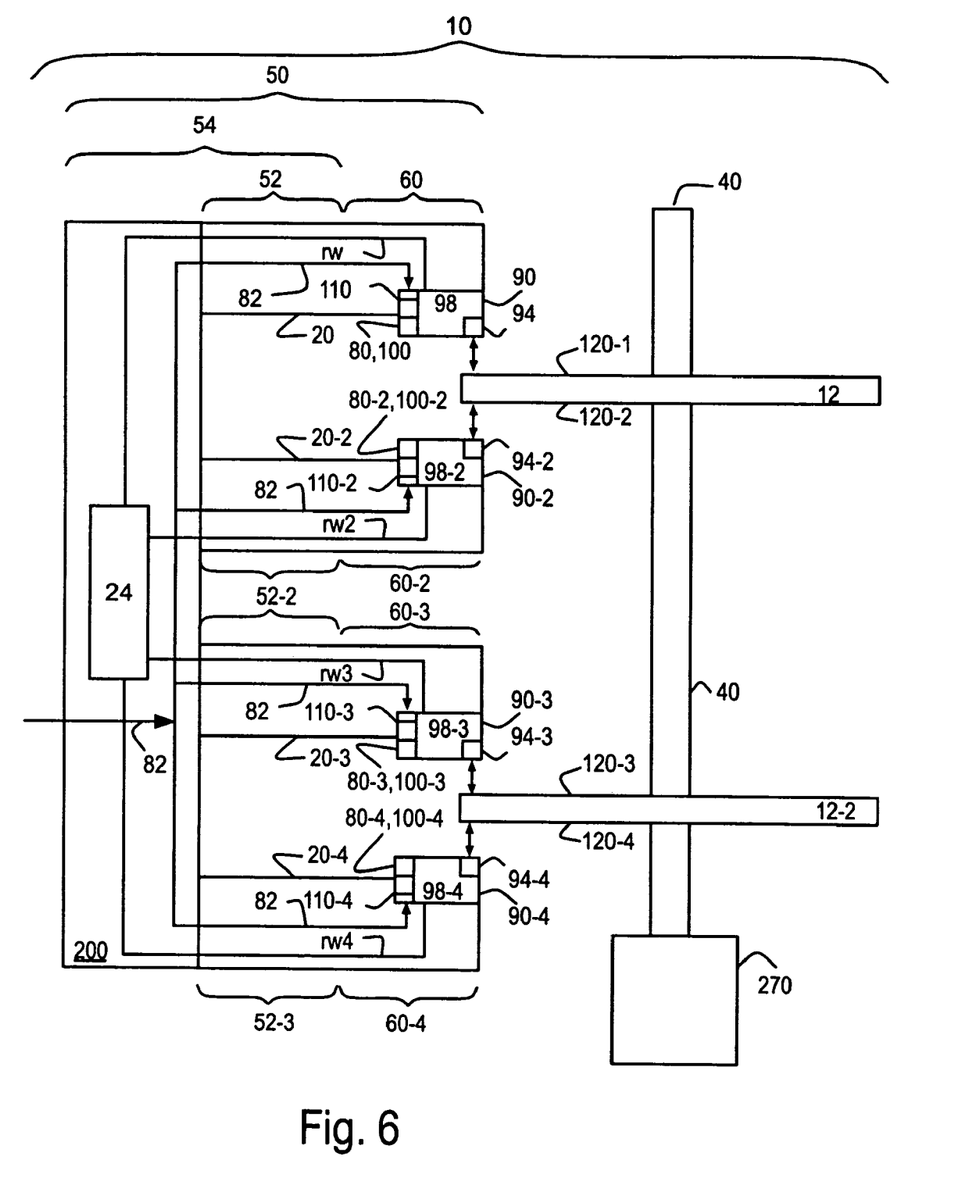
Figure 7:
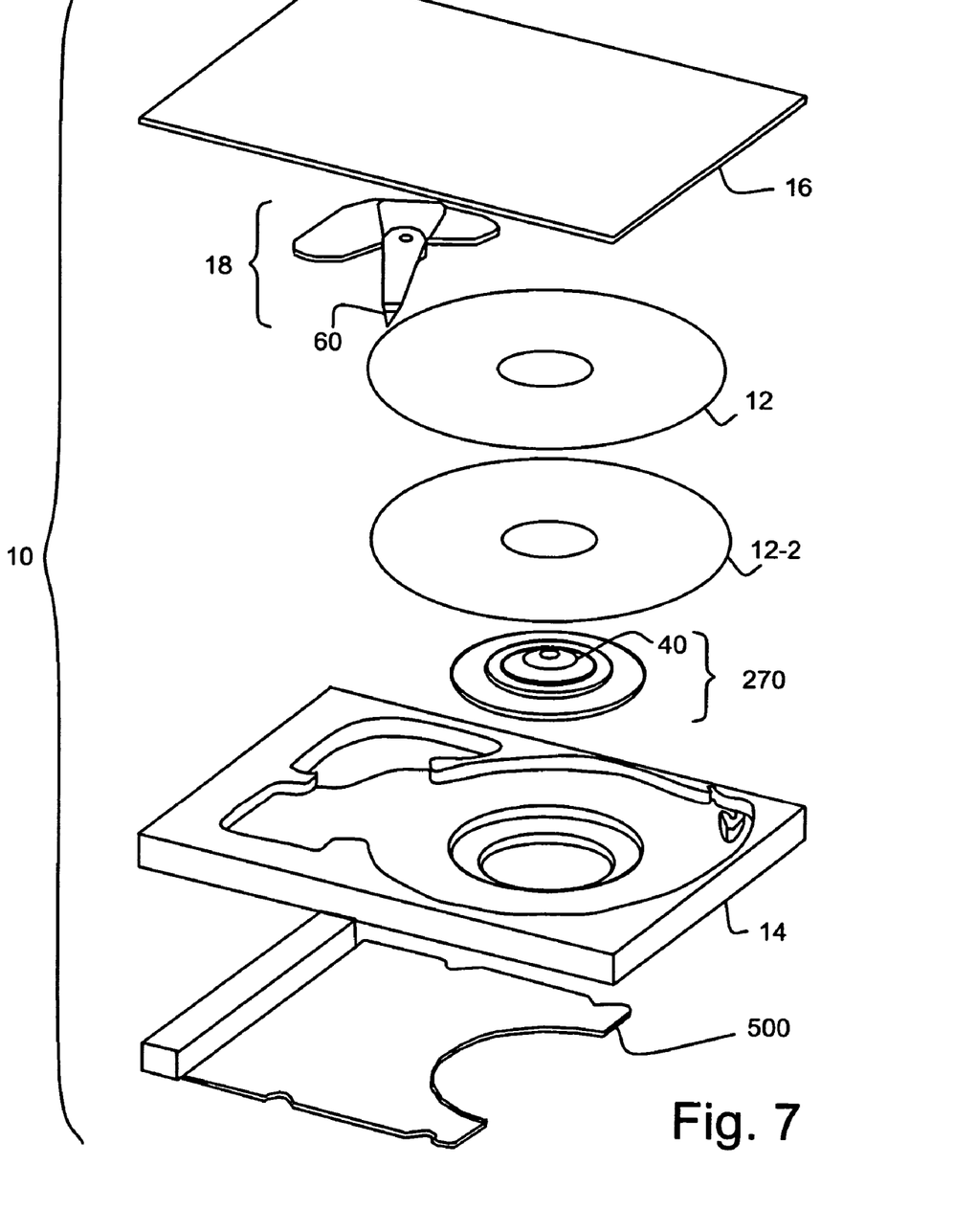

The invention also includes a head stack assembly 50 containing at least one head gimbal assembly 60 coupled to a head stack 54, as shown in FIGS. 5 and 6.

The head stack assembly 50 may include more than one head gimbal assembly 60 coupled to the head stack 54. By way of example, FIG. 6 shows the head stack assembly coupled with a second head gimbal assembly 60-2, a third head gimbal assembly 60-3 and a fourth head gimbal assembly 60-4. Further, the head stack is shown in FIG. 5 including the actuator arm 52 coupling to the head gimbal assembly. In FIG. 6, the head stack further includes a second actuator arm 52-2 and a third actuator arm 52-3, with the second actuator arm coupled to the second head gimbal assembly 60-2 and a third head gimbal assembly 60-3, and the third actuator arm coupled to the fourth head gimbal assembly 60-4. The second head gimbal assembly includes the second slider 90-2, which contains the second read-write head 94-2. The third head gimbal assembly includes the third slider 90-3, which contains the third read-write head 94-3. And the fourth head gimbal assembly includes a fourth slider 90-4, which contains the fourth read-write head 94-4.

In certain embodiments where the slider 90 includes the amplifier 96, the slider reports the amplified read signal ar0 as the result of the read access to the track 122 on the rotating disk surface 120-1. The flexure finger provides the read trace path rtp for the amplified read signal, as shown in FIG. 4B. The head stack assembly 50 may include a main flex circuit 200 coupled with the flexure finger 20, which may further include a preamplifier 24 electrically coupled to the read trace path rtp in the read-write signal bundle rw to create the read signal 25-R based upon the amplified read signal as a result of the read access.

Manufacturing the invention's head stack assembly 50 includes coupling at least one of the invention's head gimbal assembly 60 to the head stack 50 to at least partly create the head stack assembly. The process may further include coupling more than one head gimbal assemblies to the head stack. Manufacturing may further, preferably include coupling the main flex circuit 200 to the flexure finger 20, which further includes electrically coupled the preamplifier 24 to the read trace path rtp to provide the read signal 25-R as a result of the read access of the data 122 on the rotating disk surface 120-1. The invention includes the manufacturing process for the head stack assembly and the head stack assembly as a product of the manufacturing process. Coupling the head gimbal assembly 60 to the head stack 50 may further, preferably include swaging the base plate 72 to the actuator arm 52.

The invention's hard disk drive 10, shown in FIGS. 2A, 4A, 5, 6, and 7, includes the invention's head stack assembly 50 pivotably mounted through the actuator pivot 58 on a disk base 14 and arranged for the slider 90 of the head gimbal assembly 60 to be laterally positioned LP near the data 122 for the read-write head 94 to access the data on the rotating disk surface 120-1. The disk 12 is rotatably coupled to the spindle motor 270 by the spindle shaft 40. The head stack assembly is electrically coupled to an embedded circuit 500. The data may be organized on the rotating disk surface either as a radial succession of concentric circular tracks or a radial succession of joined spiral tracks.

The hard disk drive 10 may include the servo controller 600, and possibly the embedded circuit 500, coupled to the voice coil motor 18, to provide the micro-actuator stimulus signal 650 driving the micro-actuator assembly 80, and the read signal 25-R based upon the amplified read signal ar0 contained in the read-write signal bundle rw from the read-write head 94 to generate the Position Error Signal 260.

The embedded circuit 500 may preferably include the servo controller 600, as shown in FIG. 5, which may further include a servo computer 610 accessibly coupled 612 to a memory 620. A program system 1000 may direct the servo computer in implementing the method operating the hard disk drive 10. The program system preferably includes at least one program step residing in the memory. The embedded circuit may preferably be implemented with a printed circuit technology. The lateral control signal 82 may preferably be generated by a micro-actuator driver 28. The lateral control signal preferably includes the first lateral control signal 82P1 and the second lateral control signal 82P2, as well as the AC lateral control signal 82AC.

The voice coil driver 30 preferably stimulates the voice coil motor 18 through the voice coil 32 to provide coarse position of the slider 90, in particular, the read head 94-R near the track 122 on the rotating disk surface 120-1.

The embedded circuit 500 may further process the read signal 25-R during the read access to the data 122 on the rotating disk surface 120-1. The slider 90 reports the amplified read signal ar0 as the result of a read access of the data 122 on the rotating disk surface 120-1. The flexure finger 20 provides the read trace path rtp for the amplified read signal, as shown in FIG. 4B. The main flex circuit 200 receives the amplified read signal from the read trace path to create the read signal 25-R. The embedded circuit receives the read signal to read the data on the rotating disk surface.

A computer as used herein may include at least one instruction processor and at least one data processor, where each of the data processors is directed by at least one of the instruction processors.

Manufacturing the hard disk drive 10 may include pivotably mounting the head stack assembly 50 by an actuator pivot 58 to the disk base 14 and arranging the head stack assembly, the disk 12, and the spindle motor 270 for the slider 90 of the head gimbal assembly 60 to access the data 122 on the rotating disk surface 120-1 of the disk 12 rotatably coupled to the spindle motor, to at least partly create the hard disk drive. The invention includes this manufacturing process and the hard disk drive as a product of that process.

Manufacturing may further include electrically coupling the invention's head stack assembly 50 to the embedded circuit 500 to provide the read signal 25-R as the result of the read access of the data 122 on the rotating disk surface 120-1. Making the hard disk drive 10 may further include coupling the servo controller 600 and/or the embedded circuit 500 to the voice coil motor 18 and providing the micro-actuator stimulus signal 650 to drive the micro-actuator assembly 80. Making the hard disk drive may further include electrically coupling the vertical control driver of the embedded circuit to the vertical control signal VcAC of the slider 90 through the head stack assembly 50, in particular through the flexure finger 20.

Making the servo controller 600 and/or the embedded circuit 500 may include programming the memory 620 with the program system 1000 to create the servo controller and/or the embedded circuit, preferably programming a non-volatile memory component of the memory. Making the embedded circuit 500, and in some embodiments, the servo controller 600, may include installing the servo computer 610 and the memory 620 into the servo controller and programming the memory with the program system 1000 to create the servo controller and/or the embedded circuit.

Looking at some of the details of FIG. 6, the hard disk drive 10 includes a disk 12 and a second disk 12-2. The disk includes the rotating disk surface 120-1 and a second rotating disk surface 120-2. The second disk includes a third rotating disk surface 120-3 and a fourth rotating disk surface 120-4. The voice coil motor 18 includes an head stack assembly 50 pivoting through an actuator pivot 58 mounted on the disk base 14, in response to the voice coil 32 mounted on the head stack 54 interacting with the fixed magnet 34 mounted on the disk base. The actuator assembly includes the head stack with at least one actuator arm 52 coupling to a slider 90 containing the read-write head 94. The slider is coupled to the micro-actuator assembly 80.

The read-write head 94 interfaces through a preamplifier 24 on a main flex circuit 200 using a read-write signal bundle rw typically provided by the flexure finger 20, to a channel interface 26 often located within the servo controller 600. The channel interface often provides the Position Error Signal 260 (PES) within the servo controller. It may be preferred that the micro-actuator stimulus signal 650 be shared when the hard disk drive includes more than one micro-actuator assembly. It may be further preferred that the lateral control signal 82 be shared. Typically, each read-write head interfaces with the preamplifier using separate read and write signals, typically provided by a separate flexure finger. For example, the second read-write head 94-2 interfaces with the preamplifier via a second flexure finger 20-2, the third read-write head 94-3 via the a third flexure finger 20-3, and the fourth read-write head 94-4 via a fourth flexure finger 20-4.

During normal disk access operations, the hard disk drive 10 operates as follows when accessing the data 122 on the rotating disk surface 120-1. The spindle motor 270 is directed by the embedded circuit 500, often the servo-controller 600, to rotate the disk 12, creating the rotating disk surface for access by the read-write head 94. The embedded circuit, in particular, the servo controller drives the voice coil driver 30 to create the voice coil control signal 22, which stimulates the voice coil 32 with an alternating current electrical signal, inducing a time-varying electromagnetic field, which interacts with the fixed magnet 34 to move the voice coil parallel the disk base 14 through the actuator pivot 58, which alters the lateral position LP of the read-write head of the slider 90 in the head gimbal assembly 60 coupled to the actuator arm 52, which is rigidly coupled to the head stack 54 pivoting about the actuator pivot. Typically, the hard disk drive first enters track seek mode, to coarsely position the read-write head near the data, which as stated above, is typically organized as a track. Once the read-write head is close to the track, track following mode is entered. Often this entails additional positioning control provided by the micro-actuator assembly 80 stimulated by the lateral control signal 82, which is driven by the micro-actuator driver 28. Reading the track may also include generating a Position Error Signal 260, which is used by the servo controller as positioning feedback during track following mode.

The hard disk drive 10 may operate by driving the vertical control signal VcAC to stimulate the vertical micro-actuator 98 to decrease the vertical position VP of the slider 90 by providing a potential difference to the first slider terminal SP1, stimulating the heating element 98 to increase the temperature of the deformation region 97, causing the deformation region to expand and alter the vertical position Vp of the read-write head 94 above the rotating disk surface 120-1, as shown in FIG. 1C. Whenever the deformation region expands in the expansion chamber 93 and contacts the heat sink plate 95P, heat from the deformation region is thermally transferred through the contact to the heat sink plate 95P and out of the deformation region to the heat sink 95 thermally coupled 95C to the heat sink plate, lowering the temperature of the deformation region and limiting thermal pole tip protrusion of the slider. This operation may be performed when seeking a track 122 of data on the rotating disk surface 120-1, and/or when following the track on the rotating disk surface. The servo controller 600 may include means for driving the vertical control signal, which may be at least partly implemented by the vertical control driver 29 creating the vertical control signal to be provided to the vertical micro-actuator. The vertical control driver is typically an analog circuit with a vertical position digital input 290 driven by the servo computer 610 to create the vertical control signal Track following and track seeking may be implemented as means for track seeking and means for track following, one or both of which may be implemented at least in part as program steps in the program system 1000 residing in the memory 620 accessibly coupled 612 to the servo computer 610 shown in FIG. 5. Alternatively, the means for track seeking and/or the means for track following may be implemented as at least one finite state machine.

The preceding embodiments provide examples of the invention and are not meant to constrain the scope of the following claims.

What is claimed is:

1. A slider, comprising:
    a heating element coupled to a deformation region including a read-write head;
    a vertical control signal and a first slider power terminal provided to said heating element to create a potential difference, stimulating said heating element to increase the temperature of said deformation region, causing said deformation region to expand and alter the vertical position of said read-write head above a rotating disk surface in a hard disk drive; and
    an expansion chamber coupling to said deformation zone and including a heat sink plate thermally coupling to a heat sink;
    wherein whenever said deformation region expands in said expansion chamber and contacts said heat sink plate, heat from said deformation region is thermally transferred through said contact to said heat sink plate and out of said deformation region to said heat sink thermally coupled to said heat sink plate, lowering said temperature of said deformation region and limiting thermal pole tip protrusion of said slider.

2. The slider of claim 1, wherein said read-write head, includes:
    a read head using a member of the group, consisting of: a spin valve to read said data on said rotating disk surface, and a tunneling valve to read said data on said rotating disk surface.

3. The slider of claim 2, wherein said slider, further comprises:
    said read-write head providing a read differential signal pair to an amplifier to generate an amplified read signal reported by said slider as a result of read access of said data on said rotating disk surface.

4. The slider of claim 3, wherein said amplifier is opposite said air bearing surface.

5. The slider of claim 3, wherein said amplifier is separate from said deformation region.

6. The slider of claim 5, wherein said amplifier is separate from said heat sink.

7. A flexure finger for said slider of claim 1, comprising:
    a vertical control signal path providing said vertical control signal to said slider; and
    a micro-actuator assembly for coupling to said slider to aid in positioning said slider to access said data on said rotating disk surface.

8. The flexure finger of claim 7, wherein said micro-actuator assembly aids in laterally positioning said read-write head to access said data on said rotating disk surface.

9. The flexure finger of claim 8, wherein said micro-actuator assembly aids in vertically positioning said read-write head to access said data on said rotating disk surface.

10. The flexure finger of claim 7, wherein said micro-actuator assembly employs at least one member of the group, consisting of: a piezoelectric effect and an electrostatic effect, to position said slider to access said data on said rotating disk surface.

11. A method of manufacturing said flexure finger of claim 7, comprising the steps:
    forming said vertical control signal path and said micro-actuator assembly to create said flexure finger.

12. The flexure finger as a product of the process of claim 11.

13. A head gimbal assembly, comprising: said flexure finger of claim 7 coupled with said slider, further comprising:

said micro-actuator mechanically coupled to said slider to aid in positioning said slider to access said data on said rotating disk surface; and said vertical control signal path electrically coupled to said vertical control signal of said slider.

14. The head gimbal assembly of claim 13, further comprising:

a load beam electrically coupled through a via to said flexure finger to said first slider power terminal in said slider.

15. The head gimbal assembly of claim 13, wherein said micro-actuator assembly includes a first micro-actuator power terminal electrically coupled to said first slider power terminal.

16. A method of manufacturing said head gimbal assembly of claim 13, comprising the step:

coupling said flexure finger with said slider to create said head gimbal assembly, further comprising the steps:

mechanically coupling said micro-actuator assembly to said slider; and electrically coupling said first slider power terminal through said flexure finger.

17. The head gimbal assembly as a product of the process of claim 16.

18. A head stack assembly, comprising: at least one of the head gimbal assemblies of claim 13 coupled to a head stack.

19. The head stack assembly of claim 18, further comprising: at least two of said head gimbal assemblies coupled to said head stack.

20. A method of manufacturing said head stack assembly of claim 18, comprising the step:

coupling said at least one of said head gimbal assembly to said head stack to create said head stack assembly.

21. The head stack assembly as a product of the process of claim 20.

22. The hard disk drive, comprising: said head stack assembly of claim 18 pivotably mounted on a disk base and arranged for said slider of said head gimbal assembly to access said data on said rotating disk surface of said disk rotatably coupled to a spindle motor.

23. A method of manufacturing said hard disk drive of claim 22, comprising the steps:

pivotably mounting said head stack assembly by an actuator pivot to said disk base;

arranging said head stack assembly, said disk, and said spindle motor for said slider of said head gimbal assembly to access said data on said rotating disk surface of said disk rotatably coupled to said spindle motor to create said hard disk drive.

24. The hard disk drive as a product of the process of claim 23.

25. A method of operating said hard disk drive of claim 22, comprising the steps:

driving said vertical control signal to stimulate said vertical micro-actuator to alter said vertical position by stimulating said heating element to increase said temperature of said deformation region, causing said deformation region to expand and alter said vertical position of said read-write head above said rotating disk surface; and thermally transferring said heat from said deformation region through said contact to said heat sink plate and out of said deformation region to said heat sink thermally coupled to said heat sink plate, lowering said temperature of said deformation region and limiting thermal pole tip protrusion of said slider, whenever said deformation region expands in said expansion chamber and contacts said heat sink plate.

26. The method of claim 25, further comprising the steps:

seeking a track of said data on said rotating dusk surface, further comprising the step:

driving said vertical control signal to stimulate said vertical micro-actuator to alter said vertical position; and following said track of said data on said rotating disk surface, further comprising the steps:

driving said vertical control signal to stimulate said vertical micro-actuator to alter said vertical position.

* * * * *